US012784698B2

(12) United States Patent
Ogasawara

(10) Patent No.: US 12,784,698 B2
(45) Date of Patent: Nov. 3, 2026

(54) VEHICLE DISPLAY DEVICE

(71) Applicant: YAZAKI CORPORATION, Tokyo (JP)

(72) Inventor: Kazuyoshi Ogasawara, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 126 days.

(21) Appl. No.: 18/946,890

(22) Filed: Nov. 13, 2024

(65) Prior Publication Data

US 2025/0069558 A1 Feb. 27, 2025

Related U.S. Application Data

(63) Continuation of application No. PCT/JP2023/038321, filed on Oct. 24, 2023.

(30) Foreign Application Priority Data

Oct. 25, 2022 (JP) ................................ 2022-170410

(51) Int. Cl.
*G09G 3/00* (2006.01)
*G09G 3/34* (2006.01)
(Continued)

(52) U.S. Cl.
CPC ........... *G09G 3/3406* (2013.01); *G09G 3/001* (2013.01); *G09G 3/3648* (2013.01);
(Continued)

(58) Field of Classification Search
None
See application file for complete search history.

(56) References Cited

U.S. PATENT DOCUMENTS 11,945,309 B2 * 4/2024 Matsui .................. B60K 35/23
12,162,351 B2 * 12/2024 Kim .................. B60K 31/0066
(Continued)

FOREIGN PATENT DOCUMENTS

JP 2018-52281 A 4/2018
JP 2019-73272 A 5/2019
(Continued)

OTHER PUBLICATIONS

Katagiri et al. ( Translation of JP20190273272A) (Year: 2029).*
International Search Report for PCT/JP2023/038321 dated Jan. 9, 2024.

*Primary Examiner* — Saptarshi Mazumder
(74) *Attorney, Agent, or Firm* — KENEALY VAIDYA LLP

(57) ABSTRACT

A vehicle display device includes a display that displays a display image in front of a driver of a vehicle, an acquisition unit that acquires a curvature of a curve on a traveling path, and a controller. When the vehicle travels on a curved traveling path, the controller performs display image movement processing of moving, according to the curvature of the curve acquired by the acquisition unit, the display image to the direction side as a direction in which the traveling path curves and displaying the display image. When the vehicle travels on the curved traveling path and when the curvature of the curve acquired by the acquisition unit is equal to or greater than a predetermined first threshold, the controller performs, in addition to the display image movement processing, at least one of first display image change processing and second display image change processing.

7 Claims, 6 Drawing Sheets

(51) Int. Cl.

| | |
|---|---|
| ***G09G 3/36*** | (2006.01) |
| *B60K 35/235* | (2024.01) |
| *B60K 35/29* | (2024.01) |
| *B60K 35/65* | (2024.01) |
| *B60K 35/81* | (2024.01) |

(52) U.S. Cl.

CPC ............ *B60K 35/235* (2024.01); *B60K 35/29* (2024.01); *B60K 35/654* (2024.01); *B60K 35/81* (2024.01); *B60K 2360/166* (2024.01); *G09G 2320/062* (2013.01); *G09G 2340/0478* (2013.01); *G09G 2340/14* (2013.01); *G09G 2354/00* (2013.01); *G09G 2380/10* (2013.01)

(56) References Cited

U.S. PATENT DOCUMENTS

| | | | | |
|---|---|---|---|---|
| 2020/0031393 | A1 | 1/2020 | Hirota et al. | |
| 2020/0320960 | A1 | 10/2020 | Yamase | |
| 2020/0333608 | A1* | 10/2020 | Katagiri ................. | B60K 35/50 |
| 2022/0305911 | A1* | 9/2022 | Sakai ..................... | B60K 35/60 |
| 2023/0001985 | A1 | 1/2023 | Hirota et al. | |

FOREIGN PATENT DOCUMENTS

| | | | | |
|---|---|---|---|---|
| JP | 2019073272 | A * | 5/2019 | ............. B60K 35/22 |
| JP | 2020-16583 | A | 1/2020 | |
| JP | 2020-170136 | A | 10/2020 | |

* cited by examiner

VEHICLE DISPLAY DEVICE

CROSS-REFERENCE TO RELATED APPLICATION

This application is a continuation application of International Application No. PCT/JP2023/038321 filed on Oct. 24, 2023 which claims the benefit of priority from Japanese Patent Application No. 2022-170410 filed on Oct. 25, 2022 and designating the U.S., the entire contents of which are incorporated herein by reference.

BACKGROUND OF THE INVENTION

1. Field of the Invention

The present invention relates to a vehicle display device.

2. Description of the Related Art

There has been a device that displays, to a driver of a vehicle, information concerning the vehicle as a display image of a virtual image. Japanese Patent Application Laid-open No. 2020-16583 discloses a vehicle display device that includes a display unit visible to an occupant of a vehicle and changes an image of content displayed on the display unit in the same direction as a direction in which a traveling path of the vehicle turns.

There is still room for improvement in appropriately displaying a display image in a vehicle display device. For example, when a vehicle travels on a curve, depending on the curvature of a curve of a traveling path, in some case, a driver has difficulty in visually recognizing a display image displayed in front of the driver or, because of a speed difference between a stationary display image and a moving background, the driver has discomfort in the display image. For that reason, in the vehicle display device, it is desired that the display image can be appropriately displayed according to the traveling path.

SUMMARY OF THE INVENTION

An object of the present invention is to provide a vehicle display device that can appropriately display a display image according to a shape of a traveling path.

In order to achieve the above mentioned object, a vehicle display device according to one aspect of the present invention includes: a display that is mounted on a vehicle and displays a display image in front of a driver of the vehicle; an acquisition unit that acquires a curvature of a curve on a traveling path on which the vehicle travels; and a controller that controls the display, wherein the display image includes information concerning the vehicle, and when the vehicle travels on the curved traveling path, the controller performs display image movement processing of moving the display image to a side of a direction same as a direction in which the traveling path curves and displaying the display image, the moving being performed according to the curvature of the curve acquired by the acquisition unit and with respect to a display position of the display image displayed when the vehicle is traveling straight, and, when the vehicle travels on the curved traveling path and when the curvature of the curve acquired by the acquisition unit is equal to or greater than a predetermined first threshold, the controller performs, in addition to the display image movement processing, at least one of first display image change processing of displaying the display image with transmittance increased to be higher than transmittance of the display image displayed when the vehicle is traveling straight and second display image change processing of displaying the display image to be smaller than the display image displayed when the vehicle is traveling straight.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle display device according to an embodiment of the present invention is explained in detail below with reference to the drawings. Note that the present invention is not limited by the embodiment. Components in the embodiment explained below include those that can be easily assumed by those skilled in the art or those that are substantially the same.

Embodiment

Figure 1:
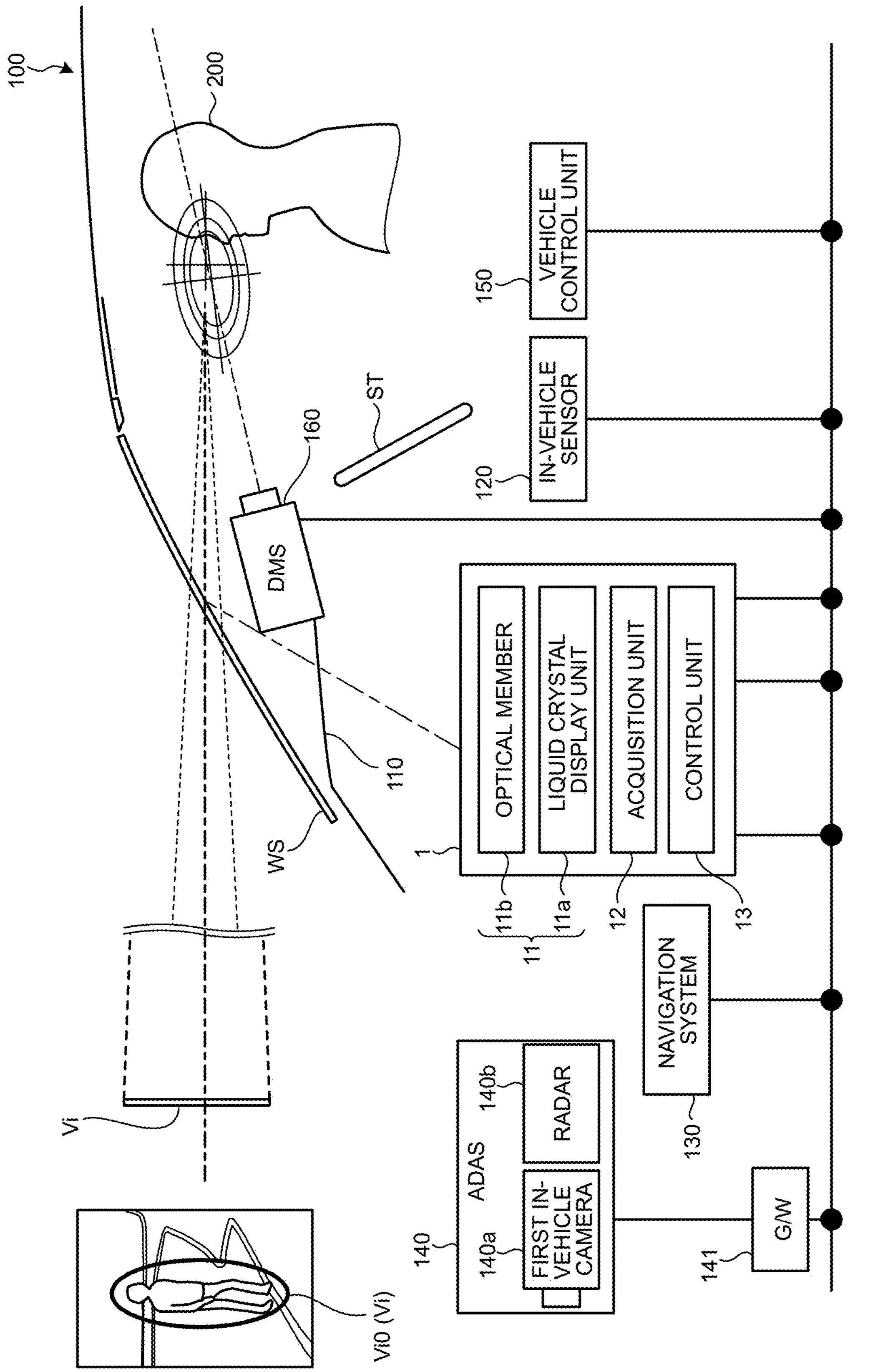
FIG. 1 is a schematic configuration diagram of a vehicle display device according to an embodiment.
Figure 2:
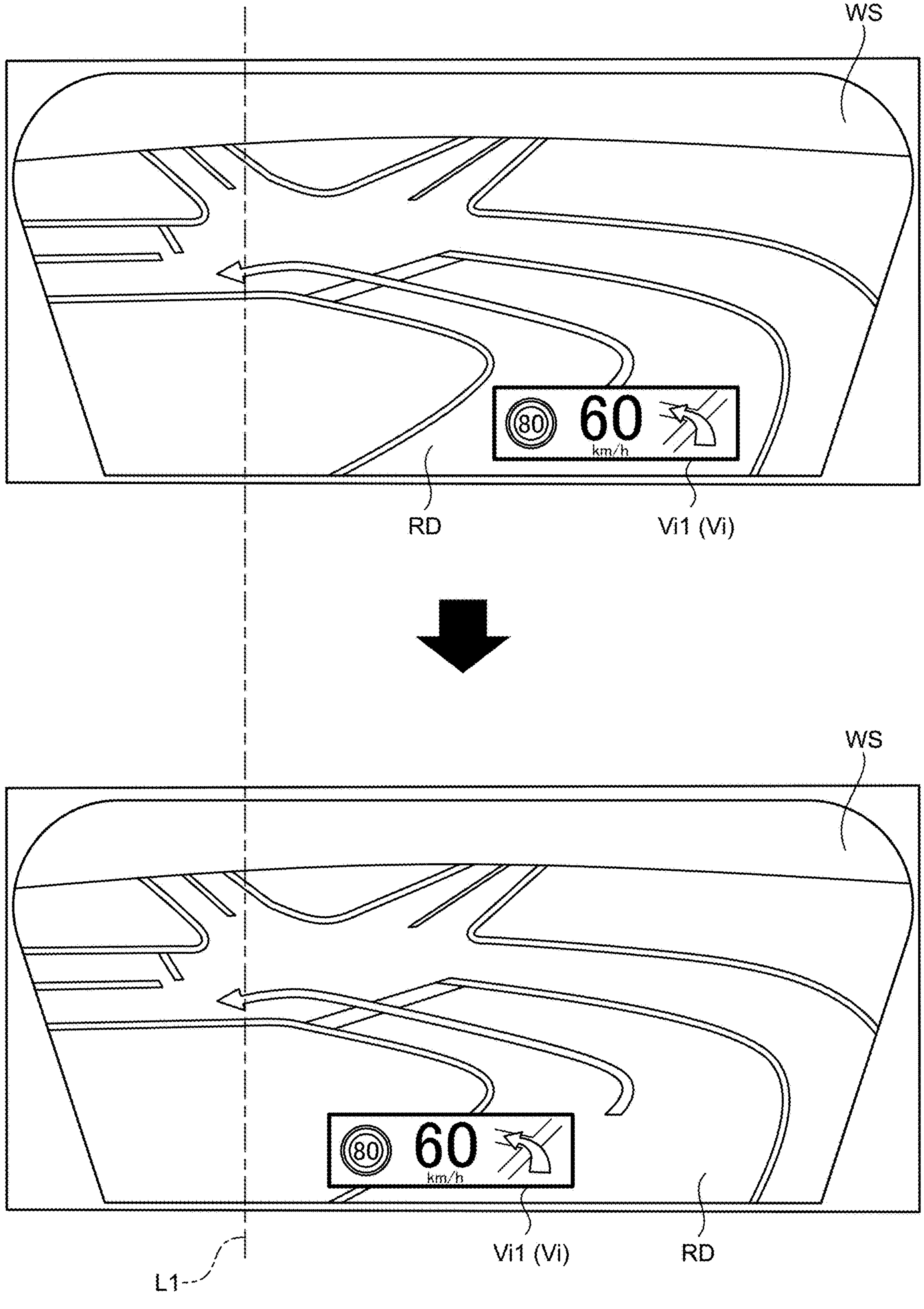
FIG. 2 is a diagram illustrating an example of display image movement processing in the vehicle display device according to the embodiment.

An embodiment is explained with reference to FIG. 1 to FIG. 6. The present embodiment relates to a vehicle display device. FIG. 1 is a schematic configuration diagram of a vehicle display device according to the embodiment, FIG. 2 is an example of display image movement processing in the vehicle display device according to the embodiment, FIGS. 3A to 3E are diagrams illustrating a relation between a display image displayed by the display image movement processing in the vehicle display device according to the embodiment and a steering hole, FIG. 4A is a diagram illustrating an example of a display image of the vehicle display device according to the embodiment, and FIGS. 4B to 4E are diagrams illustrating an example of display image change processing in the vehicle display device according to the embodiment.

As illustrated in FIG. 1, a vehicle display device 1 is, for example, a head-up display device mounted on a vehicle 100 such as an automobile. The vehicle display device 1 displays, to a driver 200, a display image Vi as a virtual image. In the embodiment, the vehicle 100 is a right-hand drive vehicle. The vehicle display device 1 may be an augmented reality head-up display device (AR-HUD) that can change a display distance of a display image seen from the driver 200.

The vehicle display device 1 according to the embodiment includes a display 11, an acquisition unit 12, a controller 13, and an optical member 13. The display 11, the acquisition unit 12, the controller 13, and the optical member 13 are housed in a housing. The housing is housed on the inside of an instrument panel 110 of the vehicle 100. An opening is formed in the instrument panel 110 at a position facing a windshield WS of the vehicle 100.

The display 11 is a device that displays an image. The display 11 includes, for example, a liquid crystal display unit 11*a* and an optical member 11*b*. The liquid crystal display unit 11*a* is, for example, a TFT-LCD (Thin Film Transistor-Liquid Crystal Display) and outputs display light of the display image Vi with light of a backlight unit. The optical member 11*b* is, for example, a reflection mirror and reflects the display light from the liquid crystal display unit 11*a* toward the windshield WS. With this configuration, the display 11 displays various display images Vi in front of the driver 200 via the opening of the instrument panel 110. For example, as illustrated at the upper left of the sheet of FIG. 1, the display 11 can display a circular display image Vi0 surrounding a person walking in front of the vehicle 100 as viewed from the driver 200 in order to call attention of the driver 200 to the person walking in front of the vehicle 100. Note that, more specifically, the display image Vi0 is displayed by acquiring information outside the vehicle 100 (a coordinate value of the person walking in front of the vehicle 100 and the like) from an ADAS140, a vehicle controller 150, and the like explained below and the controller 13 displaying the display image Vi0 to be superimposed on the person based on assembling positions of an in-vehicle camera (a first in-vehicle camera 140*a* explained below), the vehicle display device 1, and the like.

When the vehicle 100 is traveling on a curved traveling path RD, the acquisition unit 12 acquires information from an ADAS140, an in-vehicle sensor 120, a car navigation system 130, a vehicle controller 150, a driver monitoring device (DMS) 160, and the like explained below to acquire the curvature of the curve in the traveling path RD on which the vehicle 100 travels.

Here, the curvature of the curve of the traveling path RD corresponds to sharpness of the curve in the traveling path RD. A relatively large curvature of the curve means a sharp curve, and a relatively small curvature of the curve means a gentle curve.

The controller 13 controls the display 11 to display the display image Vi. The controller 13 in the embodiment can change a type, size, and the like of the display image Vi by controlling the liquid crystal display unit 11*a*. By controlling the liquid crystal display unit 11*a*, the controller 13 can change transmittance at the time when the display image Vi is displayed in front of the driver 200. Further, by controlling the optical member 11*b*, the controller 13 can change a display position of the display image Vi displayed in front of the driver 200. In the embodiment, the controller 13 changes the display position of the display image Vi displayed in front of the driver 200 by changing an angle of the reflection mirror that is the optical member 11*b*.

In the embodiment, an in-vehicle sensor 120, a car navigation system 130, an ADAS (Advanced Driver-Assistance Systems) 140, a vehicle controller 150, and a driver monitoring device (DMS) 160 are mounted on the vehicle 100.

The in-vehicle sensor 120 includes, for example, an automatic light control sensor, a three-axis gyro sensor, an illuminance switch sensor, and an ambient temperature sensor. The ADAS140 includes a first in-vehicle camera 140*a* that images scenery in front of the vehicle and a radar 140*b* and is connected to the vehicle display device 1 via a gateway 141. The ADAS140 grasps a situation around a vehicle V using the first in-vehicle camera 140*a* and the radar 140*b* and supports driving operation of the driver.

The vehicle controller 150 is, for example, an ECU (Electronic Control Unit) and controls the units in the vehicle 100. The vehicle controller 150 can transmit, to the acquisition unit 12, various kinds of information concerning the vehicle such as a steering angle of steering wheel ST of the vehicle 100 and vehicle speed of the vehicle 100. The driver monitoring device 160 includes a second in-vehicle camera disposed in front of the driver and acquires various kinds of information concerning the driver from an image of the driver captured by the second in-vehicle camera. For example, the driver monitoring device 160 acquires state information of the driver, visual point position information of the driver, and the like.

In the embodiment, the acquisition unit 12 acquires the information concerning the steering angle of the steering wheel ST of the vehicle 100 from the vehicle controller 150 to acquire the curvature of a curve of a traveling path on which the vehicle 100 is traveling.

When the vehicle 100 is traveling on a straight traveling path RD, that is, when the vehicle 100 is traveling straight, the acquisition unit 12 acquires, as the information concerning the steering angle of the steering wheel ST of the vehicle 100, information indicating that the steering wheel ST of the vehicle 100 is not substantially turned. Then, the controller 13 determines that vehicle 100 is traveling straight by acquiring, from the acquisition unit 12, information indicating that steering wheel ST of the vehicle 100 is not substantially turned. When determining that the vehicle 100 is traveling straight, the controller 13 controls the display 11 to display a display image Vi1 in front of the driver (see FIG. 2). In the embodiment, since the vehicle 100 is a right-hand drive vehicle, the display image Vi1 is displayed below the windshield WS of the vehicle 100 and at a position slightly on the right as viewed from a driver's seat side of the vehicle 100.

When the vehicle 100 travels on the curved traveling path RD, the acquisition unit 12 estimates and acquires a curvature of the curve of the traveling path RD based on the information concerning the steering angle of the steering wheel ST of the vehicle 100. That is, the acquisition unit 12 estimates and acquires the curvature of the curve of the traveling path RD based on information concerning to which side of the left and right and how much the steering wheel ST of the vehicle 100 is turned as viewed from the driver's seat of the vehicle 100. Then, the controller 13 determines, from the curvature of the curve acquired from the acquisition unit 12, whether the vehicle 100 is traveling on the curved traveling path RD and performs display image movement processing when determining that the vehicle 100 is traveling on the curved traveling path RD. In the display image movement processing, as illustrated in FIG. 2, the controller 13 moves, according to the curvature of the curve of the traveling path RD, the display image Vi to the side of the direction same as a curving direction of the traveling path RD with respect to a display position of the display image Vi displayed when the vehicle 100 is traveling straight and displays the display image Vi. For example, as the curvature of the curve acquired by the acquisition unit 12 is relatively larger, the controller 13 moves the display image Vi more greatly with respect to the display position of the display image Vi displayed when the vehicle 100 travels straight.

In the case illustrated in FIG. 2, the traveling path RD curves to the left as viewed from the driver's seat of the vehicle 100. The controller 13 moves the display image Vi toward the left side from a position in front of the driver as viewed from the driver's seat of the vehicle 100. For example, the controller 13 slides and moves the display image Vi toward the left side from the position in front of the driver as viewed from the driver's seat of the vehicle 100.

The display image movement processing is explained in more detail with reference to FIG. 3A to FIG. 3E. Note that, in FIG. 3A to FIG. 3E, the display image Vi0 is simplified and described as a symbol "A" for simplification of the drawing. The windshield WS in FIG. 3A to FIG. 3E is obtained by extracting a part of a lower portion of the windshield WS of the vehicle 100.

Figure 3A:
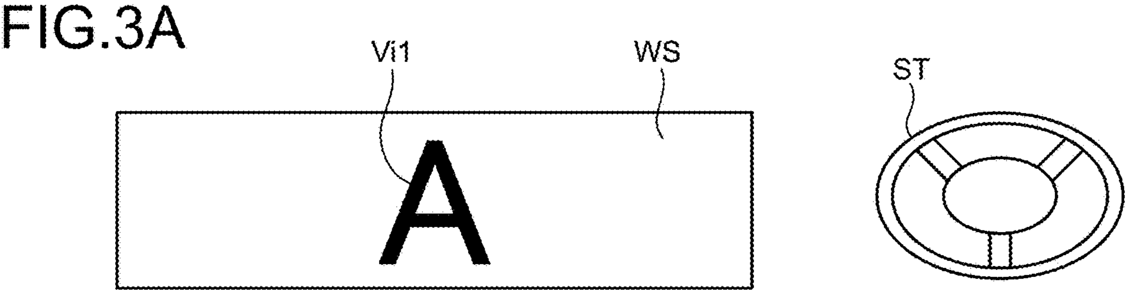
FIGS. 3A to 3E are diagrams illustrating a relation between a display image displayed by the display image movement processing in the vehicle display device according to the embodiment and a steering hole.
Figure 4A:
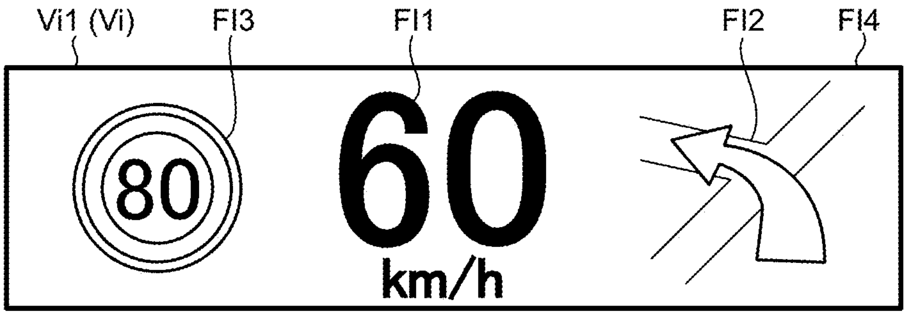
FIG. 4A is a diagram illustrating an example of a display image of the vehicle display device according to the embodiment and FIGS. 4B to 4E are diagrams illustrating an example of display image change processing in the vehicle display device according to the embodiment.
Figure 4B:
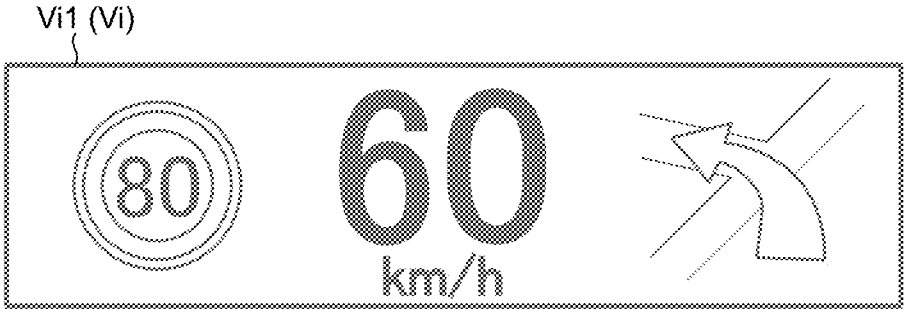
Figure 4C:
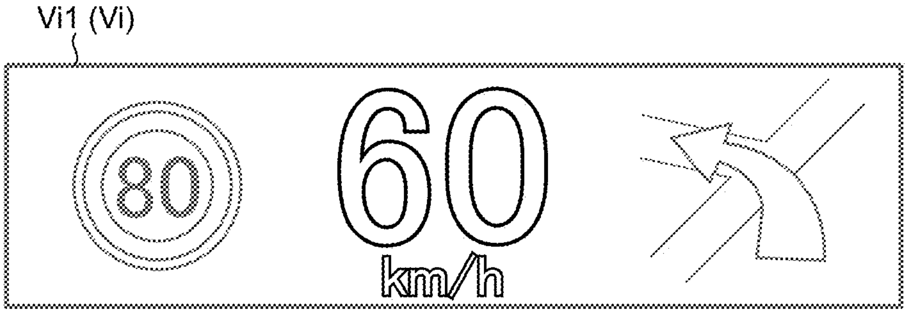
Figure 4D:
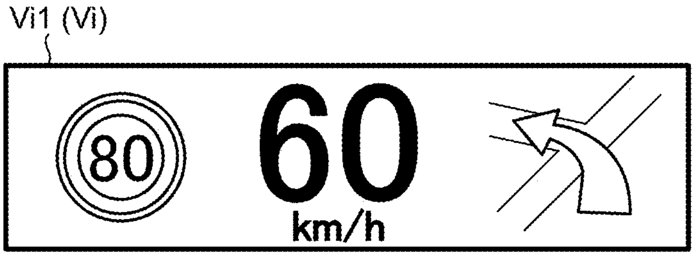

FIG. 3A illustrates a display position of the display image Vi0 in the case in which the steering angle of the steering wheel ST is substantially 0 and the vehicle 100 is traveling straight. At this time, the display position of the display image Vi0 is the front of the driver 200.

Figure 3B:
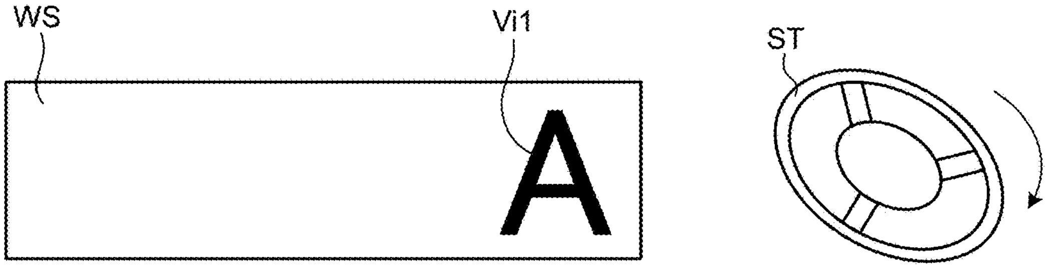

As illustrated in FIG. 3B, when the steering wheel ST is turned to the right side as viewed from the driver 200, the controller 13 performs the display image movement processing and causes the display 11 to move the display image Vi from the position in front of the driver 200 toward the right side as viewed from the driver's seat. When moving the display image Vi, the controller 13 may perform animation display for, for example, sliding the display image Vi while displaying a residual image of the display image Vi.

Figure 3C:
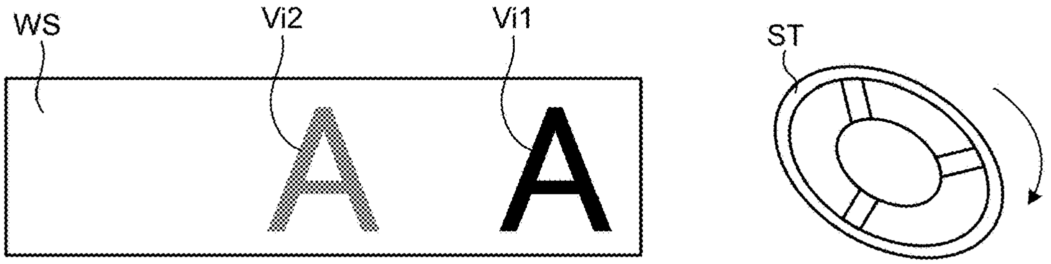

In the display image movement processing, without sliding the display image Vi, while increasing the transmittance of the display image Vi1 displayed at the position in front of the driver and displaying the display image Vi1 as the residual image Vi2, the controller 13 may display a new display image Vi1 at a position on the right side of the position in front of the driver as viewed from the driver's seat and thereafter hide the residual image Vi2 (see FIG. 3C).

Figure 3D:
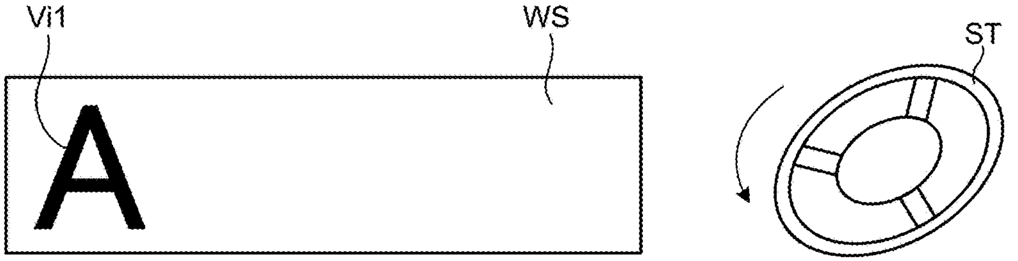

On the other hand, as illustrated in FIG. 3D, when the steering wheel ST is turned to the left side as viewed from the driver 200, the controller 13 performs the display image movement processing and causes the display 11 to slide and move the display image Vi from the position in front of the driver toward the left side as viewed from the driver's seat.

Figure 3E:
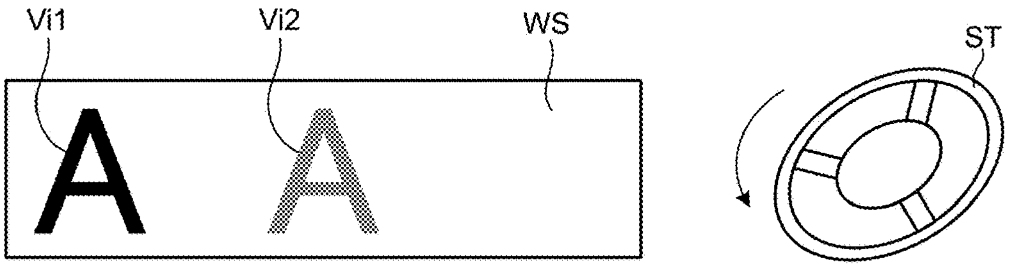

Note that, in the display image movement processing, when the display image Vi is moved from the position in front of the driver to the left side as viewed from the driver's seat, without sliding the display image Vi, while increasing the transmittance of the display image Vi1 displayed at the position in front of the driver and displaying the display image Vi1 as the residual image Vi2, the controller 13 may display a new display image Vi1 at a position on the left side of the position in front of the driver as viewed from the driver's seat and thereafter hide the residual image Vi2 (see FIG. 3E).

As illustrated in FIG. 4A, the display image Vi1 in the embodiment includes a speed indication FIL, a navigation indication FI2, and an indication FI3 indicating legal speed as indications (images) indicating information concerning the vehicle 100. The display image Vi0 is a group of images in which a plurality of indications (the speed indication FI1, the navigation indication FI2, and the indication FI3 indicating the legal speed) indicating these kinds of information concerning the vehicle 100 is surrounded by a frame-shaped indication (image) FI4. Note that the display image Vi may not include the frame-shaped indication FI4. In this case, the display image Vi0 is a group of images including a plurality of indications (indications FI1 to FI3), a relative positional relation among which is fixed. Here, in the plurality of indications FI1 to FI3, "the relative positional relation is fixed" means that, even if the display position of the display image Vi0 is moved, images including the indications FIL to FI3 are displayed to be in a congruent relation before and after the movement and that, even if the display image Vi is reduced or enlarged and displayed, the images including the indications FIL to FI3 are displayed to be in a similar relation before and after the reduction display or before and after the enlargement display. When a part of the indications FIL to FI3 is omitted, the positional relations are applied only to the indications that are not omitted.

In FIG. 4A, the speed indication FI1 indicates traveling speed of the vehicle 100 with bold alphanumeric characters and symbols. The navigation indication FI2 is illustrated in a bird's-eye view of looking down, from directly above, a road on which the vehicle 100 travels. A guide indication for guiding the vehicle 100 is indicated by an arrow. The indication indicating the legal speed is displayed as an icon imitating a speed sign.

The display image Vi1 is treated as a group of images in the display image movement processing and the display image change processing explained below. For example, in the display image movement processing, the plurality of indications (the speed indication FI1, the navigation indication FI2, and the indication FI3 indicating the legal speed) indicating the information concerning the vehicle 100 and the frame-shaped indication FI4 are moved and displayed in a state in which a relative positional relation among the indications is fixed.

When the vehicle 100 is traveling on the curved traveling path RD and the curvature of the curve acquired by the acquisition unit 12 is equal to or greater than a predetermined first threshold, the controller 13 performs the display image change processing of making the display of the display image Vi1 less conspicuous in addition to the display image movement processing. In the embodiment, the first threshold is a threshold for determining whether the curve of the traveling path RD is a sharp curve. For example, a plurality of the first thresholds may be set according to the traveling speed of the vehicle 100. For example, when the traveling speed of the vehicle 100 is 60 Km/h, the first threshold may be set to a curvature of 0.0067 (a curvature radius: 150 m) and, when the traveling speed of the vehicle 100 is 120 Km/h, the first threshold may be set to a curvature of 0.001 (a curvature radius: 710 m).

As the display image change processing, the controller 13 in the embodiment performs at least one of first display image change processing (see FIG. 4B and FIG. 4C) of displaying the display image Vi with transmittance increased to be higher than the transmittance of the display image Vi displayed when the vehicle 100 is traveling straight and second display image change processing (see FIG. 4D and FIG. 4E) of displaying the display image Vi to be smaller than the display image Vi displayed when the vehicle 100 is traveling straight.

For example, when performing the first display image change processing, the controller 13 increases the transmittance of the display image Vi by adjusting an output of a backlight unit of the display 11 to make the luminance of display light of the display image Vi1 emitted from the display 11 smaller than the luminance of display light of the display image Vi1 emitted from the display 11 when the vehicle 100 is traveling straight.

Figure 4E:
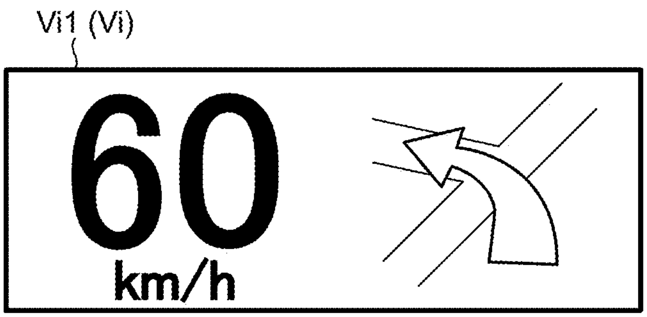

When performing the second display image change processing, the controller 13 controls the liquid crystal display unit 11*a* of the display 11 to display the display image Vi1 to be smaller than the display image Vi1 at the time when the vehicle 100 is traveling straight. Note that, when the second display image change processing is performed, a part of the plurality of indications indicating the information concerning the vehicle 100 may be omitted. For example, as illustrated in FIG. 4E, the display image Vi1 may be displayed to be small by omitting the indication FI3 indicating the legal speed among the speed indication FI1, the navigation indication FI2, and the indication FI3 indicating the legal speed.

As explained above, the vehicle display device 1 in the embodiment is mounted on the vehicle 100 and includes the display 11 that displays the display image Vi in front of the driver 200 of the vehicle 100, the acquisition unit 12 that acquires the curvature of the curve in the traveling path RD on which the vehicle 100 travels, and the controller 13 that controls the display 11. The display image Vi includes the information concerning the vehicle 100. When the vehicle 100 travels on the curved traveling path RD, the controller 13 performs the display image movement processing of moving the display image Vi to the side of the direction same as the direction in which the traveling path RD curves and displaying the display image Vi, the moving being performed according to the curvature of the curve acquired by the acquisition unit 12 and with respect to the display position of the display image Vi displayed when the vehicle 100 travels straight. When the vehicle 100 travels on the curved traveling path RD and when the curvature of the curve acquired by the acquisition unit 12 is equal to or greater than the predetermined first threshold, the controller 13 performs, in addition to the display image movement processing, at least one of the first display image change processing of displaying the display image Vi with transmittance increased to be higher than the transmittance of the display image Vi displayed when the vehicle 100 is traveling straight and the second display image change processing of displaying the display image Vi to be smaller than the display image Vi displayed when the vehicle 100 is traveling straight.

The vehicle display device 1 in the embodiment can improve the visibility of the display image Vi by moving, according to the curvature of the curve, the display image Vi to the side of the direction same as the direction in which the traveling path RD curves and displaying the display image Vi. When the curvature of the curve is equal to or greater than the first threshold (for example, a sharp curve), by increasing the transmittance of the display image Vi or reducing the display image Vi in size, the vehicle display device 1 in the embodiment can make the display image Vi less conspicuous and prevent the driver 200 from having discomfort because of a speed difference between a moving background and the display image Vi. That is, the vehicle display device 1 in the embodiment can appropriately display the display image Vi according to the shape of the traveling path RD.

In the embodiment, the display image Vi is the group of images in which the plurality of indications FIL to FI3 indicating the information concerning the vehicle 100 is surrounded by the frame-shaped indication FI4 or the group of images including the plurality of indications (the indications FI1 to FI3), the relative positional relation among which is fixed.

In the vehicle display device 1 in the embodiment, by handling the plurality of indications FIL to FI3 as one unit by surrounding the plurality of indications FIL to FI3 indicating the information concerning the vehicle with the frame-shaped indication FI4 or fixing the relative positional relation among the plurality of indications FI1 to FI3, the driver can easily visually recognize a specific indication indicating the information concerning the vehicle in the display image, for example, before and after the display image movement processing.

In the embodiment, when displaying the display image Vi to be smaller than the display image Vi displayed when the vehicle 100 is traveling straight, the controller 13 omits a part of the plurality of indications FIL to FI3 indicating the information concerning the vehicle included in the display image Vi and displays the display image Vi.

When displaying the display image Vi to be small, by omitting a part of the indications indicating the information concerning the vehicle 100, the vehicle display device 1 in the embodiment can secure a display range of particularly important information large, for example, in the display image Vi and can prevent the driver 200 from overlooking the particularly important information.

Note that, in the embodiment explained above, an example is explained in which the acquisition unit 12 acquires the curvature of the curve of the traveling path RD by acquiring the information concerning the steering angle of the steering wheel ST from the vehicle controller 150. However, the acquisition unit 12 is not limited to this configuration and may acquire the curvature of the curve of the traveling path RD by acquiring information from various electronic equipment, in-vehicle systems, and the like mounted on the vehicle 100. The acquisition unit 12 may acquire the curvature of the curve of the traveling path RD by combining a plurality of kinds of information acquired from the various electronic equipment, in-vehicle systems, and the like mounted on the vehicle 100.

For example, the acquisition unit 12 may acquire the curvature of the curve of the traveling path RD, on which the vehicle 100 travels, by acquiring information concerning the angular velocity of the vehicle 100 with the three-axis gyro sensor of the in-vehicle sensor 120. For example, the acquisition unit 12 may acquire the curvature of the curve of the traveling path RD, on which the vehicle 100 travels, by acquiring information concerning the traveling path RD of the vehicle 100 from the car navigation system 130. Further, the acquisition unit 12 may acquire the curvature of the curve of the traveling path RD, on which the vehicle 100 is traveling, by acquiring the shape of the traveling path RD from an image or the like in front of the vehicle 100 acquired from the ADAS140.

First Modification of the Embodiment

A first modification of the embodiment is explained.

In the first modification, when the curvature of the curve acquired by the acquisition unit 12 is smaller than the first threshold and a time in which the vehicle 100 travels on the curved traveling path RD is equal to or greater than a predetermined second threshold, the controller 13 performs the display image movement processing. For example, the acquisition unit 12 acquires, from the information concerning the traveling path RD acquired from the car navigation system 130 and the information concerning the traveling speed of the vehicle 100 acquired from the vehicle controller 150, the time in which the vehicle 100 travels on the curved traveling path RD. The acquisition unit 12 may acquire, from the information concerning the traveling speed of the vehicle 100 traveling on the curved traveling path RD, the time in which the vehicle 100 travels on the curved traveling path RD. In this case, timing when the display movement processing is performed is delayed to some extent from time when the vehicle 100 entered the curve, and the display movement processing is started from a point in time when the acquisition unit 12 determines that the time in which the vehicle 100 travels on the curved traveling path RD is equal to or greater than the predetermined second threshold.

The second threshold is an indicator for determining whether the time in which the vehicle 100 travels on the curved traveling path RD is a certain degree of length of time. That is, in the first modification, when the traveling path RD is a relatively gentle and long curve, the controller 13 performs the display image movement processing. The second threshold may be set by the driver 200 considering how the display image Vi is seen or may be set in the vehicle display device 1 in advance.

In the first modification, when the curvature of the curve acquired by the acquisition unit 12 is equal to or greater than the first threshold or when the time in which the vehicle 100 travels on the curved traveling path RD is smaller than the predetermined second threshold, the controller 13 performs at least one of the first display image change processing and the second display image change processing without performing the display image movement processing. That is, in the first modification, when the traveling path RD is a relatively steep curve or when time in which the vehicle 100 travels on the curved traveling path RD is short, the controller 13 performs at least one of the first display image change processing and the second display image change processing without performing the display image movement processing.

As described above, in the first modification, when the curvature of the curve acquired by the acquisition unit 12 is smaller than the first threshold and the time during which the vehicle 100 travels on the curved traveling path RD is equal to or greater than the predetermined second threshold, the controller 13 performs the display image movement processing. When the curvature of the curve acquired by the acquisition unit 12 is equal to or greater than the first threshold or the time during which the vehicle 100 travels on the curved traveling path RD is smaller than the predetermined second threshold, the controller 13 performs at least one of the first display image change processing and the second display image change processing without performing the display image movement processing.

In the vehicle display device 1 in the first modification, when the curvature of the curve acquired by the acquisition unit 12 is equal to or greater than the first threshold or when the time in the vehicle 100 travels on the curved traveling path RD is smaller than the predetermined second threshold, by performing at least one of the first display image change processing and the second display image change processing without performing the display image movement processing, the controller 13 can prevent the display image movement processing from being frequently performed on a pass road or the like where small curves continue. The vehicle display device 1 in the first modification can prevent the driver from feeling annoyance about a display image by preventing the display image movement processing from being frequently performed.

Second Modification of the Embodiment

A second modification of the embodiment is explained. In the second modification, the acquisition unit 12 acquires visual point position information of the driver 200 from the driver monitoring device 160, and changes the display position of the display image Vi1 according to the visual point position information of the driver 200 when the controller 13 moves a display image. Other components are the same as the components of the vehicle display device 1 according to the embodiment.

Figure 5A:
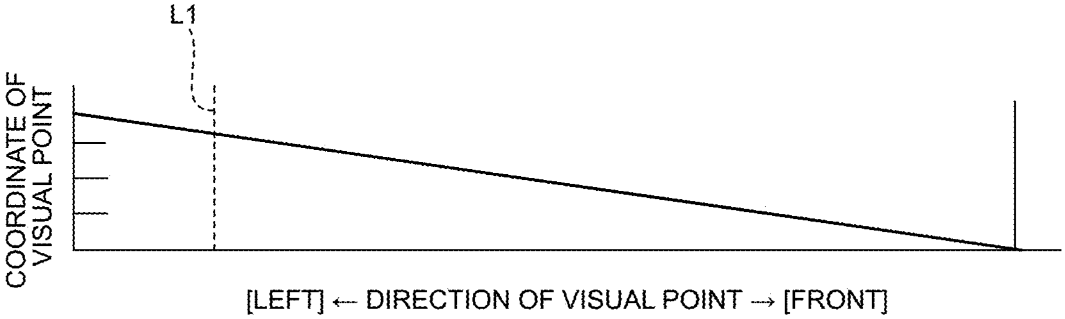
FIG. 5A is a graph diagram illustrating a correspondence between a coordinate of a visual point of a driver and a direction of the visual point of the driver in a second modification.
Figure 5B:
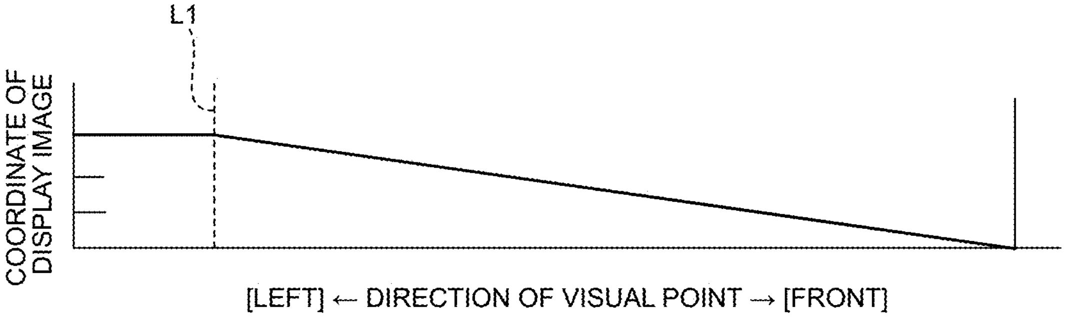
FIG. 5B is a graph diagram illustrating a correspondence between a coordinate of a display position of a display image and a direction of the visual point of the driver in the second modification.
Figure 5C:
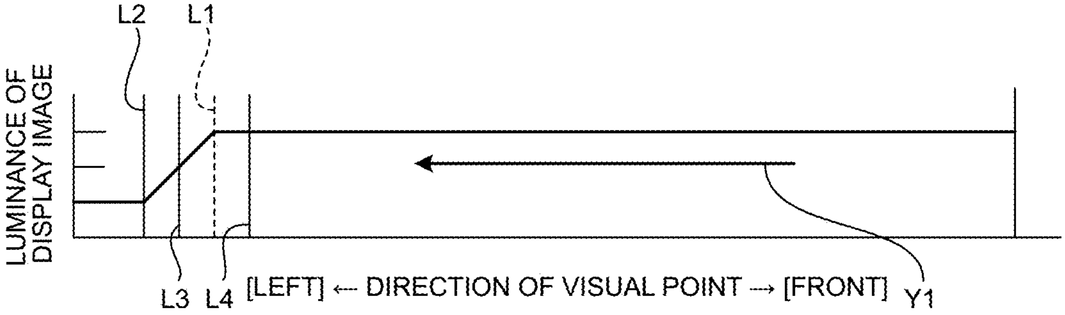
FIGS. 5C and 5D are graphs illustrating a correspondence between the luminance of a display image and a direction of the visual point of the driver the second modification.
Figure 5D:
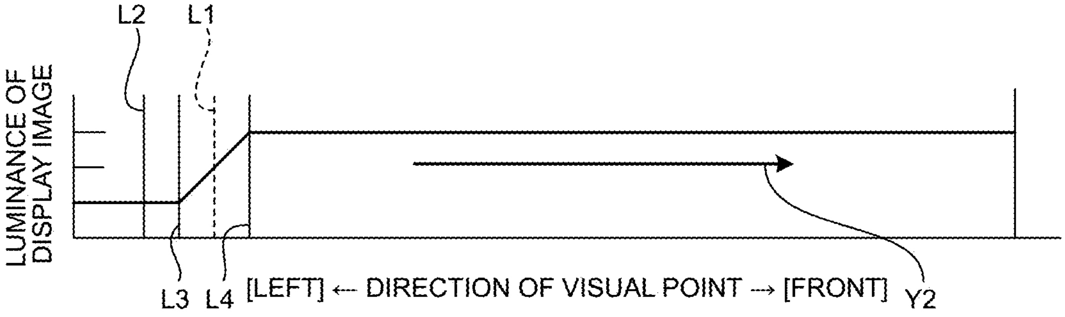

FIG. 5A is a graph illustrating a correspondence between a coordinate of a visual point of a driver and a direction of the visual point of the driver in the second modification, FIG. 5B is a graph illustrating a correspondence between a coordinate of a display position of a display image and the direction of the visual point of the driver in the second modification, and FIG. 5C and FIG. 5D are graphs illustrating a correspondence between the luminance of the display image and the direction of the visual point of the driver in the first modification.

A horizontal axis in the graphs of FIGS. 5A to 5D corresponds to the direction of the visual point of the driver 200. A vertical axis of FIG. 5A indicates a coordinate of a visual point position of the driver 200 in the vehicle width direction. As a larger value of the vertical axis means that the visual point position of the driver 200 is present on the left side with respect to the front of the driver 200 as viewed from the driver 200.

The coordinate of the visual point position of the driver 200 and the direction of the visual point of the driver 200 correspond to each other. As illustrated in FIG. 5A, when viewed from the driver 200, further on the left in the direction of the visual point of the driver 200, the coordinate of the visual point position of the driver 200 increases.

A vertical axis of FIG. 5B indicates a coordinate of a display position of the display image Vi1 in the vehicle width direction. Here, a dotted line L1 in FIGS. 5A to 5D indicates a position (a display limit position) where the display 11 can display the display image Vi1 on the left side to the maximum as viewed from the driver 200. As illustrated in FIG. 5B, the controller 13 may change the coordinate of the display image Vi1 to correspond to the direction of the visual point of the driver 200.

When the visual point of the driver 200 moves to the left side beyond the position indicated by the dotted line L1, the display image Vi1 is displayed at a position where the display 11 can display the display image Vi1 on the left side to the maximum.

A vertical axis in FIG. 5C corresponds to the level of the luminance of the display image Vi1 displayed in FIG. 5B. FIG. 5C illustrates an example in which the visual point of the driver 200 moves from the front side to the left side of the driver 200 in the direction of an arrow Y1.

In FIG. 5C, when the visual point of the driver 200 is within a range in which the display image Vi1 can be displayed on the display 11, that is, when the visual point of the driver 200 is present further on the front side than the dotted line L1, the controller 13 displays the display image Vi1 with normal luminance (normal transmittance). On the other hand, in FIG. 5C, when the visual point of the driver 200 is present further on the left side than the dotted line L1, the controller 13 displays the display image Vi1 with the luminance of the display image Vi1 reduced to be lower than the normal luminance (increases the transmittance). At this time, the controller 13 reduces the luminance and displays the display image Vi1 as the visual point of the driver 200 moves further away from the dotted line L1 toward the left side. Then, when the luminance of the display image Vi1 becomes equal to or smaller than a certain value, even if the visual point of the driver 200 moves to a position further on the left side than the position L2, the controller 13 displays the display image Vi1 while maintaining the luminance. At this time, the luminance of the display image Vi1 is kept, for example, at such a degree that the driver 200 is not completely unable to visually recognize the display image Vi1.

FIG. 5D illustrates a change in the luminance of the display image Vi1 at the time when the visual point of the driver moves from the left side to the front side. That is, FIG. 5D illustrates a change in the luminance of the display image Vi1 in the case in which the visual point of the driver 200 moves in the direction opposite to the direction of the arrow Y1 in FIG. 5C.

A vertical axis of FIG. 5D corresponds to the level of the luminance of the display image Vi1 as in FIG. 5C. FIG. 5C illustrates an example of a case in which the visual point of the driver 200 moves from the left side to the front side in the direction of the arrow Y2 as described above.

In FIG. 5D, when the visual point of the driver 200 is present further on the left side than the position indicated by the dotted line L1, the display image Vi1 is displayed with luminance lower than the normal luminance at a position where the display 11 can display the display image Vi1 on the left side to the maximum. Then, as the visual point of the driver 200 approaches the dotted line L1, the controller 13 increases the luminance of the display image Vi1 and displays the display image Vi1. At this time, in FIG. 5C, the controller 13 starts to increase the luminance of the display image Vi1 at a position L3 further on the dotted line L1 side than when the luminance of the display image Vi1 stops decreasing (L2). Then, when the visual point of the driver 200 moves further to the front side than the position indicated by the dotted line L1, the controller 13 displays the display image Vi1 with the normal luminance at a position L4 slightly further on the front side than the position of the dotted line L1.

As explained above, in the second modification, the acquisition unit 12 acquires position information of the visual point of the driver 200. In the display image movement processing, the controller 13 displays the display image Vi1 to correspond to the position of the visual point of the driver 200 in the vehicle width direction of the vehicle 100. When the position of the visual point of the driver 200 moves beyond the position L1 of the display limit, which is a limit position where the display 11 can display the display image Vi1 to correspond to the position of the visual point of the driver 200, in the vehicle width direction, the controller 13 displays the display image Vi1 at the position L1 of the display limit. The controller 13 displays the display image Vi1 with the transmittance of the display image Vi1 increased as the position of the visual point of the driver 200 moving beyond the position L1 of the display limit moves further away from the position L1 of the display limit.

The vehicle display device 1 in the second modification displays the display image Vi1 with the transmittance of the display image Vi1 increased as the position of the visual point of the driver 200 moving beyond the position L1 of the display limit moves further away from the position L1 of the display limit. Therefore, it is possible to prevent the driver 200 from feeling annoyance about the display image Vi displayed at a position slightly away from the visual point.

Third Modification of the Embodiment

Figure 6A:
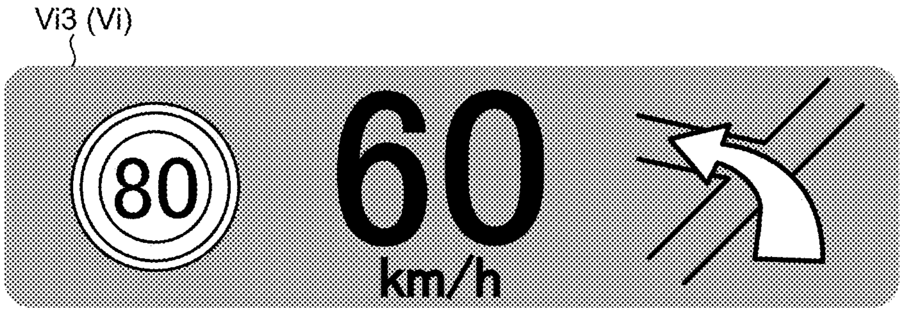
FIGS. 6A to 6C are diagrams illustrating examples of display images of a vehicle display device according to a third modification.
Figure 6B:
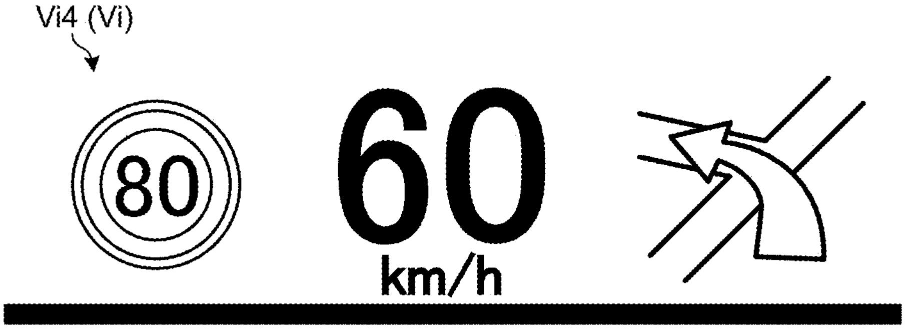
Figure 6C:
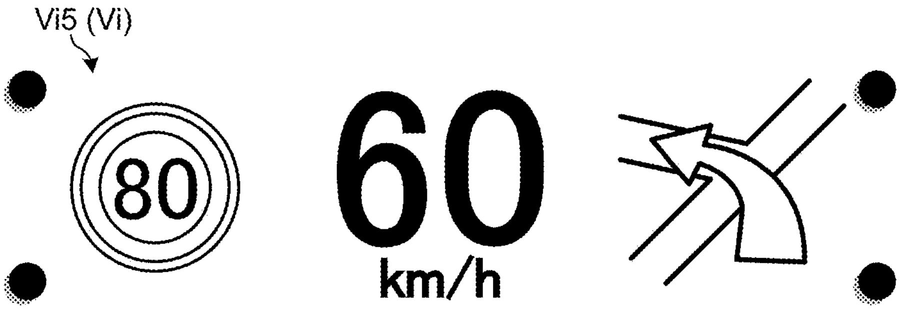

Subsequently, a third modification of the embodiment is explained. FIGS. 6A to 6C are diagrams illustrating examples of display images of a vehicle display device according to a third modification.

The display image Vi3 illustrated in FIG. 6A is a display image in which the speed indication FI1, the navigation indication FI2, and the indication FI3 indicating the legal speed are surrounded by a semitransparent background color such as pink. A display image Vi4 illustrated in FIG. 6B is an image formed as a group of images by arranging a bar-like display extending in the vehicle width direction below the speed indication FI1, the navigation indication FI2, and the indication FI3 indicating the legal speed arranged in the vehicle width direction. A display image Vi5 illustrated in FIG. 6C is an image formed as a group of images by surrounding, with four round dots, four corners of a region where the speed indication FI1, the navigation indication FI2, and the indication FI3 indicating the legal speed are arranged.

In the third modification, the vehicle display device 1 displays any one of the display images Vi3 to Vi5 instead of the display image Vi1. Other components are the same as the components in the embodiment explained above.

Note that, although the vehicle 100 is explained as the right-hand drive vehicle in the embodiment and the modifications explained above, the vehicle 100 may be a left-hand drive vehicle.

The contents disclosed in the embodiment and the modifications explained above can be combined as appropriate and executed.

The vehicle display device according to the present embodiment can improve the visibility of the display image by moving, according to the curvature of the curve, the display image in the same direction as the direction in which the traveling path turns and displaying the display image. When the curvature of the curve is equal to or greater than the first threshold (for example, a sharp curve), by increasing the transmittance of the display image or reducing the display image in size, it is possible to make the display image less conspicuous and prevent the driver from having discomfort in the display image because of the speed difference between the moving background and the display image. That is, the vehicle display device according to the present embodiment has an effect that a display image Vi can be appropriately displayed according to the shape of a traveling path RD.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:

a display that is mounted on a vehicle and displays a display image in front of a driver of the vehicle;

an acquisition unit that is configured to acquire acquires a curvature of a curve on a traveling path on which the vehicle travels; and a controller that is configured to control the display, wherein the display image includes information concerning the vehicle, if the vehicle travels on the curved traveling path, and if the curvature of the curve acquired by the acquisition unit is smaller than a predetermined first threshold and a time in which the vehicle travels on the curved traveling path is equal to or greater than a predetermined second threshold, the controller is configured to perform display image movement processing of moving the display image to a side of a direction same as a direction in which the traveling path curves and displaying the display image, the moving being performed according to the curvature of the curve acquired by the acquisition unit and with respect to a display position of the display image displayed if the vehicle is traveling straight, and if the vehicle travels on the curved traveling path, and if the curvature of the curve acquired by the acquisition unit is equal to or greater than the first threshold or if the time in which the vehicle travels on the curved traveling path is smaller than the predetermined second threshold, the controller is configured to perform at least one of first display image change processing of displaying the display image with transmittance increased to be higher than transmittance of the display image displayed if the vehicle is traveling straight and second display image change processing of displaying the display image to be smaller than the display image displayed if the vehicle is traveling straight processing without performing the display image movement processing.

2. The vehicle display device according to claim 1, wherein the display image is a group of images in which a plurality of indications indicating information concerning the vehicle is surrounded by a frame-shaped indication or a group of images including the plurality of indications, a relative positional relation among which is fixed.

3. The vehicle display device according to claim 2, wherein, if the display image is to be displayed at a smaller size than the display image if the vehicle is traveling straight, the controller is configured to omit a part of the plurality of indications indicating the information concerning the vehicle included in the display image and displays the display image.

4. The vehicle display device according to claim 1, wherein the acquisition unit is configured to acquire position information of a visual point of the driver, the controller is configured to display, in the display image movement processing, the display image to correspond to a position of the visual point of the driver in a vehicle width direction of the vehicle, if the position of the visual point of the driver moves beyond a position of a display limit, which is a limit position where the display can display the display image to correspond to the position of the visual point of the driver, in the vehicle width direction, the controller is configured to display the display image at the position of the display limit, and the controller is configured to increase transmittance of the display image as the position of the visual point of the driver moves beyond the position of the display limit and moves further away from the position of the display limit, and is configured to display the display image.

5. The vehicle display device according to claim 2, wherein the acquisition unit is configured to acquire position information of a visual point of the driver, the controller is configured to display, in the display image movement processing, the display image to correspond to a position of the visual point of the driver in a vehicle width direction of the vehicle, if the position of the visual point of the driver moves beyond a position of a display limit, which is a limit position where the display can display the display image to correspond to the position of the visual point of the driver, in the vehicle width direction, the controller is configured to display the display image at the position of the display limit, and the controller is configured to increase transmittance of the display image as the position of the visual point of the driver moves beyond the position of the display limit and moves further away from the position of the display limit, and is configured to display the display image.

6. The vehicle display device according to claim 3, wherein the acquisition unit is configured to acquire position information of a visual point of the driver, the controller is configured to display, in the display image movement processing, the display image to correspond to a position of the visual point of the driver in a vehicle width direction of the vehicle, if the position of the visual point of the driver moves beyond a position of a display limit, which is a limit position where the display can display the display image to correspond to the position of the visual point of the driver, in the vehicle width direction, the controller is configured to display the display image at the position of the display limit, and the controller is configured to increase transmittance of the display image as the position of the visual point of the driver moves beyond the position of the display limit and moves further away from the position of the display limit, and is configured to display the display image.

7. A vehicle display device comprising: a display that is mounted on a vehicle and configured to display displays a display image in front of a driver of the vehicle;

an acquisition unit that is configured to acquire a curvature of a curve on a traveling path on which the vehicle travels; and a controller that is configured to control the display, wherein the display image includes information concerning the vehicle, if the vehicle travels on the curved traveling path, the controller is configured to perform display image movement processing of moving the display image to a side of a direction same as a direction in which the traveling path curves and displaying the display image, the moving being performed according to the curvature of the curve acquired by the acquisition unit and with respect to a display position of the display image displayed if the vehicle is traveling straight, if the vehicle travels on the curved traveling path and the curvature of the curve acquired by the acquisition unit is equal to or greater than a predetermined first threshold, the controller is configured to perform, in addition to the display image movement processing, at least one of first display image change processing of displaying the display image with transmittance increased to be higher than transmittance of the display image displayed if the vehicle is traveling straight and second display image change processing of displaying the display image smaller than the display image displayed if the vehicle is traveling straight, the acquisition unit is configured to acquire position information of a visual point of the driver, the controller is configured to display, in the display image movement processing, the display image to correspond to a position of the visual point of the driver in a vehicle width direction of the vehicle, if the position of the visual point of the driver moves beyond a position of a display limit, which is a limit position where the display can display the display image to correspond to the position of the visual point of the driver, in the vehicle width direction, the controller is configured to display the display image at the position of the display limit, and the controller is configured to increase transmittance of the display image as the position of the visual point of the driver moves beyond the position of the display limit and moves further away from the position of the display limit, and is configured to display the display image.

* * * * *